United States Patent [19]
Weber et al.

[11] 3,940,236
[45] Feb. 24, 1976

[54] METHODS AND APPARATUS FOR THE HEAT TREATMENT OF FINE-GRAINED MATERIALS

[75] Inventors: Paul Weber, Oelde; Hans Mollenkopf; Kurt Henning, both of Neubeckum; Otto Heinemann, Ennigerloh; Heinz-Herbert Schmits, Rheda; Wolfgang Rother, Stromberg; Horst Ritzmann, Enniger; Jürgen Wurr, Ennigerloh; Karl Krutzner, Jr., Neubeckum; Werner Schossler, Ahlen; Wolf Goldmann; Georg Schepers, both of Ennigerloh, all of Germany

[73] Assignee: Polysius AG, Neubeckum, Germany

[22] Filed: May 13, 1974

[21] Appl. No.: 469,358

[30] Foreign Application Priority Data
May 15, 1973  Germany............................ 2324565

[52] U.S. Cl.................... 432/14; 34/57 R; 432/15; 432/58; 432/106
[51] Int. Cl.²......................................... F27B 15/12
[58] Field of Search................ 432/14, 15, 58, 106; 34/57 R

[56] References Cited
UNITED STATES PATENTS
| | | | |
|---|---|---|---|
| 3,441,258 | 4/1969 | Gieskieng | 432/58 |
| 3,653,644 | 4/1972 | Polysius et al. | 34/57 R |
| 3,752,455 | 8/1973 | Zacpal | 432/58 |
| 3,834,860 | 9/1974 | Fukuda | 432/106 |
| 3,864,075 | 2/1975 | Christiansen | 432/106 |

*Primary Examiner*—John J. Camby
*Attorney, Agent, or Firm*—Learman & McCulloch

[57] ABSTRACT

Fine-grained material such as raw ground cement adapted to be fired in a rotary tube furnace is introduced to a vertical perheater and falls through a heating zone located at a level below the level at which the material enters the preheater. A stream of air enters the preheater at a level below the heating zone and passes upwardly at sufficient velocity to entrain the material that has passed through the heating zone, thereby causing such material to pass again through the heating zone. From the preheater the material is delivered to the furnace for final firing.

15 Claims, 3 Drawing Figures

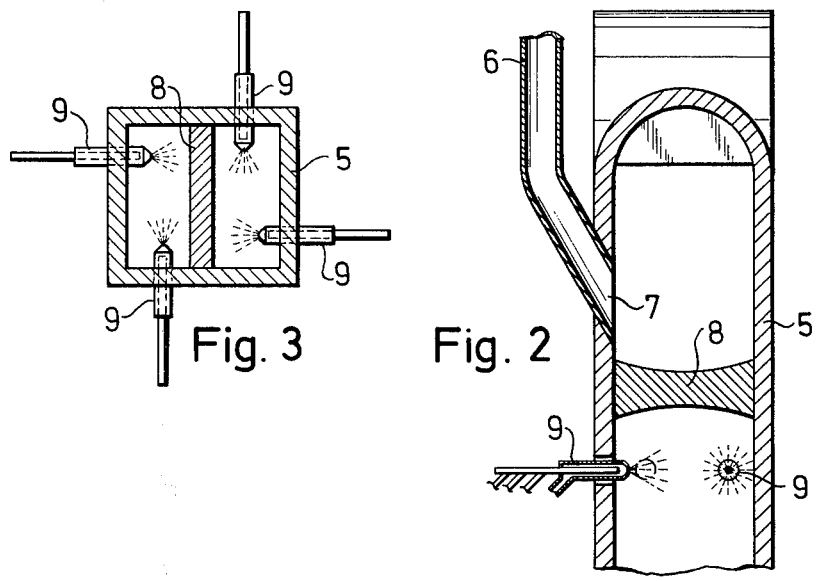

METHODS AND APPARATUS FOR THE HEAT TREATMENT OF FINE-GRAINED MATERIALS

This invention relates to the heat-treatment of fine-grained material such as raw ground cement, which is preheated in a preheater with the hot exhaust gases from a rotary tube furnace, heated and then finally fired in the rotary tube furnace.

In the manufacture of cement, clay, lime, magnesite, dolomite and the like, the heat treatment of the fine-grained material is frequently effected by first preheating the material in a preheater consisting of several cyclones, using the hot exhaust gases from a rotary tube furnace, before it is then finally fired or sintered in the rotary tube furnace. In this case the greater part of the heating must be effected in the rotary tube furnace, while only a lesser part of the total heat energy is supplied to the material in the pre-heater. This distribution of the heating effect between the preheater and the rotary tube furnace is not optimal from the capital cost aspect, since the specific capital costs of the rotary tube furnace are relatively high.

In order to be able to make the rotary tube furnace with smaller dimensions in cross-section and/or length, attempts have hitherto been made to dispose a prefiring zone between the preheater and the rotary tube furnace, wherein the preheated material is heated as high as possible (though without passing from the condition of powdered free-flowing solid to that of reduced fluidity due to the incipient grain coarsening and possibly melt-phase formation). The special problem in designing a prefiring zone of this type is that extremely uniform feed of fuel to the material is necessary in order to avoid excessive firing of individual particles of material (with all the associated difficulties such as caking, agglomerate formation, etc.).

In one known method this prefiring zone is formed by a whirl chamber directly heated by burners, and from which the material passes into the rotary tube furnace. Another known method uses a burner chamber with the material and fuel entering and leaving tangentially. The disadvantage of these known methods lies in the high capital costs of the prefiring zone which causes a considerable fraction of the savings made possible in the rotary tube furnace to be lost again.

The invention is based on the avoidance of these disadvantages by the provision of a method of the type initially described wherein the desired uniform heat-treatment of the material in the prefiring zone is made possible with very low expenditure on equipment.

According to the invention this objective is achieved in that in a pipe, along which furnace exhaust gases flow in a generally vertical direction from below upwards, between the rotary tube furnace and the preheater, a firing zone extending over substantially the entire cross-section of said pipe is produced at a level such that at least a substantial part of the material passes through said firing zone more than once.

With the method according to the invention, the gas pipe which is in any case present between the rotary tube furnace and the preheater is used as a firing chamber, so that no appreciable extra capital costs arise from this firing zone. On the other hand the transfer of a considerable part of the heat transmission into this firing zone enables the rotary tube furnace to be made substantially smaller.

Of particular importance in the method provided by the invention is the position of the firing zone in the said gas pipe. Since in this gas pipe the particles of material move partly with the gases and partly in counter-flow, and depending on the construction of the preheater partly undergo a reversal of their direction of movement (as with a preheater comprising cyclones and whirl chambers) and partly perform an up-and-down cyclonic movement (as with a counter-flow shaft provided with cross-section constrictions), the firing zone can be disposed in such manner that at least an appreciable part of the material passes through the firing zone more than once. In this way a particularly intensive transfer of heat from fuel to material is achieved in the firing zone.

The oxygen concentration in the gases supplied to the firing zone should be between 5 and 14%, and preferably between 8 and 12%. In this case the oxygen concentration in the rotary tube furnace exhaust gas is preferably set to at least 2.5% (i.e., above the usual oxygen content), so that only the additionally needed amount of oxygen has to be supplied to the firing zone from another source (for instance the cooler outlet air). The entire amount of oxygen needed can also be supplied via the exhaust gases from the rotary tube furnace.

Numerous further features of the invention will be described below in reference to the description of two embodiments in the drawings, wherein:

FIG. 2 is a section along the line II—II of FIG. 1; and

FIG. 3 is a section on the line III—III of FIG. 1.

Figure 1:
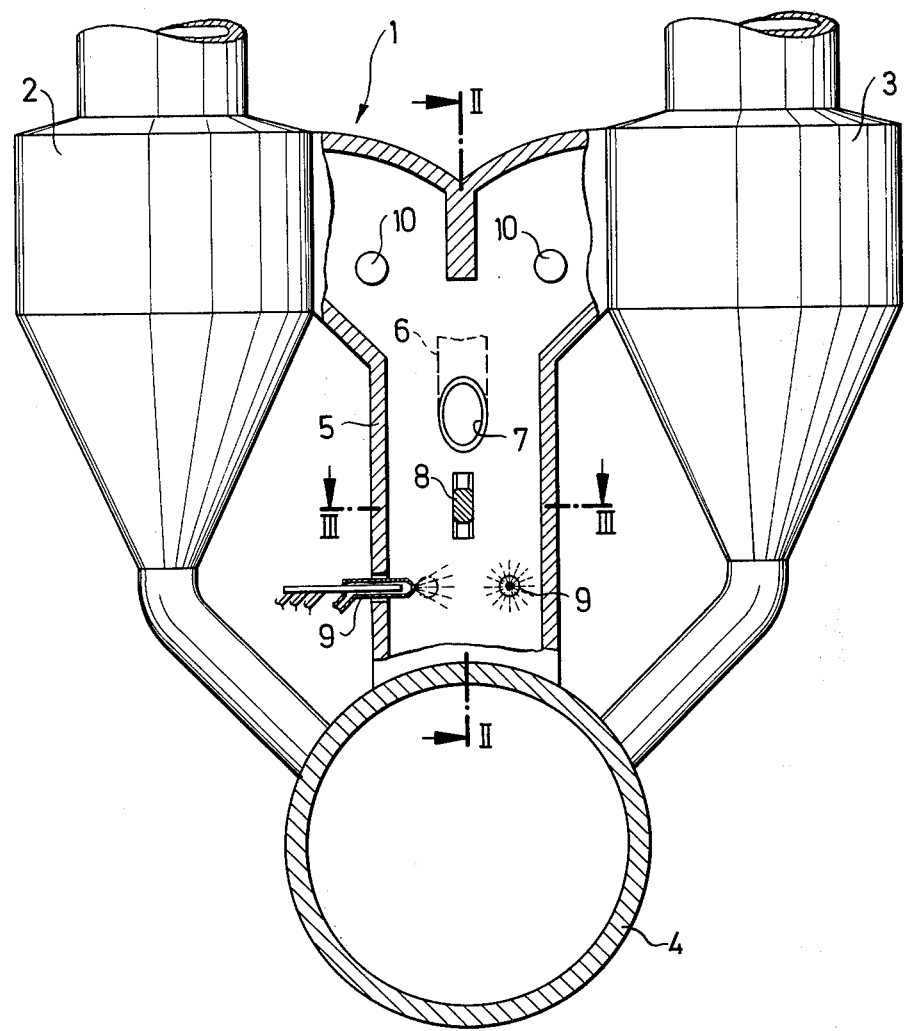
FIG. 1 is a vertical section through the main parts of apparatus for carrying out the method of the invention.

The apparatus shown in part in FIGS. 1 – 3 comprises a preheater 1 formed of a number of cyclones and whirl chambers superimposed at different levels, only the two cyclones 2, 3 of the lowest level being shown in FIG. 1. The apparatus also includes a rotary tube furnace 4 whose exhaust gases flow to the two cyclones 2, 3 via a gas pipe 5.

Material is injected into the gas pipe 5 through a feed pipe 6 which comes from a central whirl chamber in the next higher level. A bridge-shaped distributor member 8 is located in the gas pipe 5 below the feed aperture 7.

In order to produce a generally horizontal firing zone, in accordance with the invention there are now disposed below this distributor member 8 a number of fuel jets 9 which feed finely divided liquid or gaseous fuel into the gas pipe 5. In the embodiment shown, see especially FIG. 3, the fuel jets 9 are so disposed and directed that the fuel is fed into the gas pipe 5 in the form of a horizontal rotary flow (clockwise in FIG. 3).

If necessary, additional burners 10 are also provided above the mouth of the feed pipe 6 as a safeguard in cases of breakdown.

The apparatus operates as follows:

After being well-heated in the individual stages of the cyclone preheater, the material passes through the feed pipe 6 and the aperture 7 into the gas pipe 5. On meeting the distributor member 8 the flow of material is broken up. However, under the influence of its kinetic energy a large proportion of the material first drops somewhat further down in the gas pipe 5, and during its falling movement passes through the firing zone which is formed over the whole cross-section of the gas pipe 5 in the vicinity of the fuel jets 9. The material is then deflected by the exhaust gases from the rotary tube furnace 4 as they move from the bottom of the gas pipe 5 upwards, the velocity of the gases being sufficient as to entrain the material. Thus it passes a second time, though now in the upwards direction, through the firing zone at the level of the fuel jets 9, and in this manner is again strongly heated. But since the fuel is fed into the area of this firing zone in very fine distribution, avoiding the formation of intense flames, the fine-grained material is heated very uniformly and localized overheating is avoided.

The material now highly heated in this manner passes with the gases into cyclones 2 and 3 where it is separated in known manner and fed to the rotary tube furnace 4 where it is finally fired.

As already stated, an important part of the oxygen needed for combustion in the said firing zone is made available by suitable adjustment of the residual oxygen content in the exhaust gases from the rotary tube furnace. In this connection it is advantageous that only an appreciably less heat transfer, as compared with the previous normal mode of operation, has to take place in the furnace itself. The fuel jets 9 can therefore be run with quite a small amount of air.

In order to achieve optimum conditions in the firing zone, it may be beneficial to make the fuel jets 9 adjustable, in a known manner, in the horizontal and vertical directions. The fuel jets can also be provided in a number of superimposed planes, thereby to provide a defined firing zone with uniform firing conditions over the entire cross-section of the gas pipe 5, with a somewhat larger height.

We claim:

1. A method for the heat treatment of fine-grained material prior to firing said material in a furnace having a vertical waste gas conduit, said method comprising conducting waste gas from said furnace upwardly through said conduit at a predetermined velocity; supplying fine-grained material having a grain size such that a substantial portion of said material will be entrained by said gas; introducing said material downwardly into said conduit at a first level between its upper and lower ends so that said material will fall downwardly through said conduit toward the lower end thereof prior to said portion being entrained by said gas; distributing said material over the cross-sectional area of said conduit following the introduction of said material to said conduit; and combusting fuel in said conduit at a level below said first level to provide a heating zone through which said material passes as it falls toward said lower end of said conduit and through which said portion of said material again passed following its being entrained by said gas.

2. A method according to claim 1 including maintaining at said zone an atmosphere containing oxygen at a concentration of between 5 and 14 percent of said atmosphere.

3. A method according to claim 2 wherein the concentration of oxygen is maintained between 8 and 12 percent.

4. A method according to claim 1 including heating said gas prior to its introduction to said conduit.

5. A method according to claim 1 including maintaining in said gas at least 2.5 percent oxygen.

6. A method according to claim 1 including maintaining said gas stream at a velocity of at least 7 meters per second.

7. A method according to claim 1 including delivering said entrained material from said conduit to said furnace.

8. Apparatus for the heat treatment of fine-grained material prior to firing said material in a furnace, said apparatus comprising a conduit having a substantially vertical portion; inlet means for introducing material to said conduit at a first level such that said material may fall downwardly through said vertical portion; means for distributing said material over the cross-sectional area of said conduit as it falls downwardly; means for combusting fuel in said conduit at a second level lower than said first level to provide at said second level a heating zone through which said material may fall; and means for delivering waste furnace gas to said conduit at a level below said heating zone and at such velocity with respect to the grain size of said material that at least part of the material which falls through said heating zone is entrained in said gas and passed again through said heating zone.

9. Apparatus according to claim 8 wherein said heat generating means for combusting fuel comprises a plurality of fuel jets spaced from one another and disposed in a generally horizontal plane.

10. Apparatus according to claim 9 wherein said jets are spaced in such manner that fuel discharged from said jets assumes a horizontal rotary flow.

11. Apparatus according to claim 9 including means for adjusting said jets vertically and horizontally.

12. Apparatus according to claim 8 wherein said full combusting means comprises a plurality of fuel jets arranged in a number of vertically spaced horizontal planes.

13. Apparatus according to claim 8 including cyclone means in communication with said conduit and into which said gas discharges.

14. Apparatus according to claim 8 including burner means in said conduit at a level above said inlet means.

15. Apparatus according to claim 8 including a rotary tube furnace, and means for delivering material from said conduit to said furnace.

* * * * *